United States Patent
Kagawa et al.

(10) Patent No.: US 12,198,315 B2
(45) Date of Patent: Jan. 14, 2025

(54) INFORMATION PROCESSING APPARATUS, INFORMATION PROCESSING METHOD, AND STORAGE MEDIUM FOR STORING PROGRAM IN WHICH A MINIMUM LUMINANCE VALUE OF DISPLAY LUMINANCE INFORMATION IS GREATER THAN THAT OF PRINT LUMINANCE INFORMATION

(71) Applicant: CANON KABUSHIKI KAISHA, Tokyo (JP)

(72) Inventors: Hidetsugu Kagawa, Kanagawa (JP); Tetsuya Suwa, Kanagawa (JP); Maya Yazawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 354 days.

(21) Appl. No.: 17/851,347

(22) Filed: Jun. 28, 2022

(65) Prior Publication Data

US 2023/0005110 A1 Jan. 5, 2023

(30) Foreign Application Priority Data

Jul. 2, 2021 (JP) .................................. 2021-110880

(51) Int. Cl.
*G06T 5/94* (2024.01)
*H04N 1/60* (2006.01)

(52) U.S. Cl.
CPC .............. *G06T 5/94* (2024.01); *H04N 1/6005* (2013.01); *H04N 1/6027* (2013.01); *G06T 2207/10024* (2013.01)

(58) Field of Classification Search
CPC ... G06T 5/94; G06T 2207/10024; G06T 5/92; G06T 2207/20208; H04N 1/6005; H04N 1/6027; H04N 1/4072
See application file for complete search history.

(56) References Cited

U.S. PATENT DOCUMENTS 7,924,469 B2 4/2011 Ono et al.
8,237,991 B2 8/2012 Ono et al.
(Continued)

FOREIGN PATENT DOCUMENTS

JP 2011086976 A 4/2011

OTHER PUBLICATIONS

"Image parameter values for high dynamic range television for use in production and international programme exchange," Recommendation ITU-R BT.2100-2, Jul. 2018, 14 pages.

*Primary Examiner* — Christopher Wait
(74) *Attorney, Agent, or Firm* — Venable LLP (57) ABSTRACT

An information processing apparatus includes a first acquisition unit to acquire input image data, a second acquisition unit to acquire display luminance information including maximum and minimum luminance values in displaying on a display device and print luminance information including maximum and minimum luminance values to be reproduced on printed matter outputted by a printing apparatus, and a conversion unit, to cause the printing apparatus to perform the output based on the input image data for which display is performed on the display device, to convert a first luminance range of the input image data to a second luminance range that is less than the first and, then, to generate output image data having the second luminance range. The minimum luminance value of the display luminance information is greater than the minimum luminance value of the print luminance information.

19 Claims, 8 Drawing Sheets

(56) References Cited

U.S. PATENT DOCUMENTS

| | | | |
|---|---|---|---|
| 9,088,753 B2 | 7/2015 | Akiba et al. | |
| 10,582,087 B2 | 3/2020 | Ogawa et al. | |
| 10,764,469 B2 | 9/2020 | Suwa et al. | |
| 11,108,999 B2 | 8/2021 | Murasawa et al. | |
| 11,146,738 B2 | 10/2021 | Kagawa et al. | |
| 11,182,883 B2 | 11/2021 | Kagawa et al. | |
| 11,435,961 B2 | 9/2022 | Kawai et al. | |
| 2012/0268759 A1 | 10/2012 | Ono et al. | |
| 2017/0272618 A1* | 9/2017 | Higashi | H04N 1/6008 |
| 2020/0288051 A1 | 9/2020 | Suwa | |

* cited by examiner

INFORMATION PROCESSING APPARATUS, INFORMATION PROCESSING METHOD, AND STORAGE MEDIUM FOR STORING PROGRAM IN WHICH A MINIMUM LUMINANCE VALUE OF DISPLAY LUMINANCE INFORMATION IS GREATER THAN THAT OF PRINT LUMINANCE INFORMATION

Cross-Reference to Priority Application

This application claims the benefit of Japanese Patent Application No. 2021-110880, filed Jul. 2, 2021, which is hereby incorporated by reference herein in its entirety.

BACKGROUND OF THE INVENTION

Field of the Invention

The present invention relates to an information processing apparatus for converting a dynamic range of luminance, an information processing method and a storage medium for storing a program.

Description of the Related Art

In recent years, with the improvement in the performance of image capturing devices, it has become possible to acquire high dynamic range image data (HDR image data) as image capturing data such as moving images and still images. A document "Recommendation ITU-R BT.2100-2 (07/2018) Image parameter values for high dynamic range television for use in production and international programme exchange" specifies two methods for video transfer functions for HDR image data. Displays for displaying HDR image based on HDR image data have also improved in the maximum luminance that they can display, so it is possible to simultaneously display an image from an extremely-bright highlight side to a shadow side at a high image quality.

Meanwhile, a range of luminance represented by a conventional sRGB or AdobeRGB is about eighty to one hundred twenty nits in a unit of luminance determined by the International System of Units. Content represented using such a conventional luminance range is called SDR (Standard Dynamic Range). SDR content can be confirmed by being displayed on an SDR display that supports sRGB and AdobeRGB. It is also possible to display SDR content on an HDR display using an SDR luminance range.

Japanese Patent Laid-Open No. 2011-86976 discloses image processing for correcting contrast degradation when converting a dynamic range using a single tone curve.

SUMMARY OF THE INVENTION

The present invention provides an information processing apparatus for suppressing a difference in appearance to a user between an image displayed on a display based on image data and an image on printed matter based on that image data, an information processing method, and a storage medium for storing a program.

The information processing apparatus according to the present invention comprises a first acquisition unit configured to acquire input image data, a second acquisition unit configured to acquire display luminance information that includes a maximum luminance value and a minimum luminance value in displaying on a display device and print luminance information that includes a maximum luminance value and a minimum luminance value to be reproduced on printed matter to be outputted by a printing apparatus and a conversion unit configured, in order to cause the printing apparatus to perform output based on the input image data for which display is performed on the display device, to convert a first luminance range of the input image data to a second luminance range that is less than the first luminance range and then to generate output image data having the second luminance range, wherein the minimum luminance value of the display luminance information is greater than the minimum luminance value of the print luminance information, and the conversion unit converts a luminance value of a dark region of the input image data to a luminance value of a dark region of the output image data, such that a contrast of a dark region that includes the minimum luminance value of the print luminance information becomes closer to a contrast of a dark region that includes the minimum luminance value of the display luminance information.

By virtue of the present invention, it is possible to suppress a difference in appearance to a user between an image displayed on a display based on image data and an image on a printed matter based on that image data.

Further features of the present invention will become apparent from the following description of exemplary embodiments with reference to the attached drawings.

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

When performing display on a display based on HDR data, an image displayed on a display and an image on printed matter based on the HDR data may appear different to a user depending on the minimum luminance of the display, for example.

By virtue of the present disclosure, it is possible to suppress a difference in appearance to the user between an image displayed on a display based on image data and an image on a printed matter based on that image data.

First Embodiment

Figure 1:
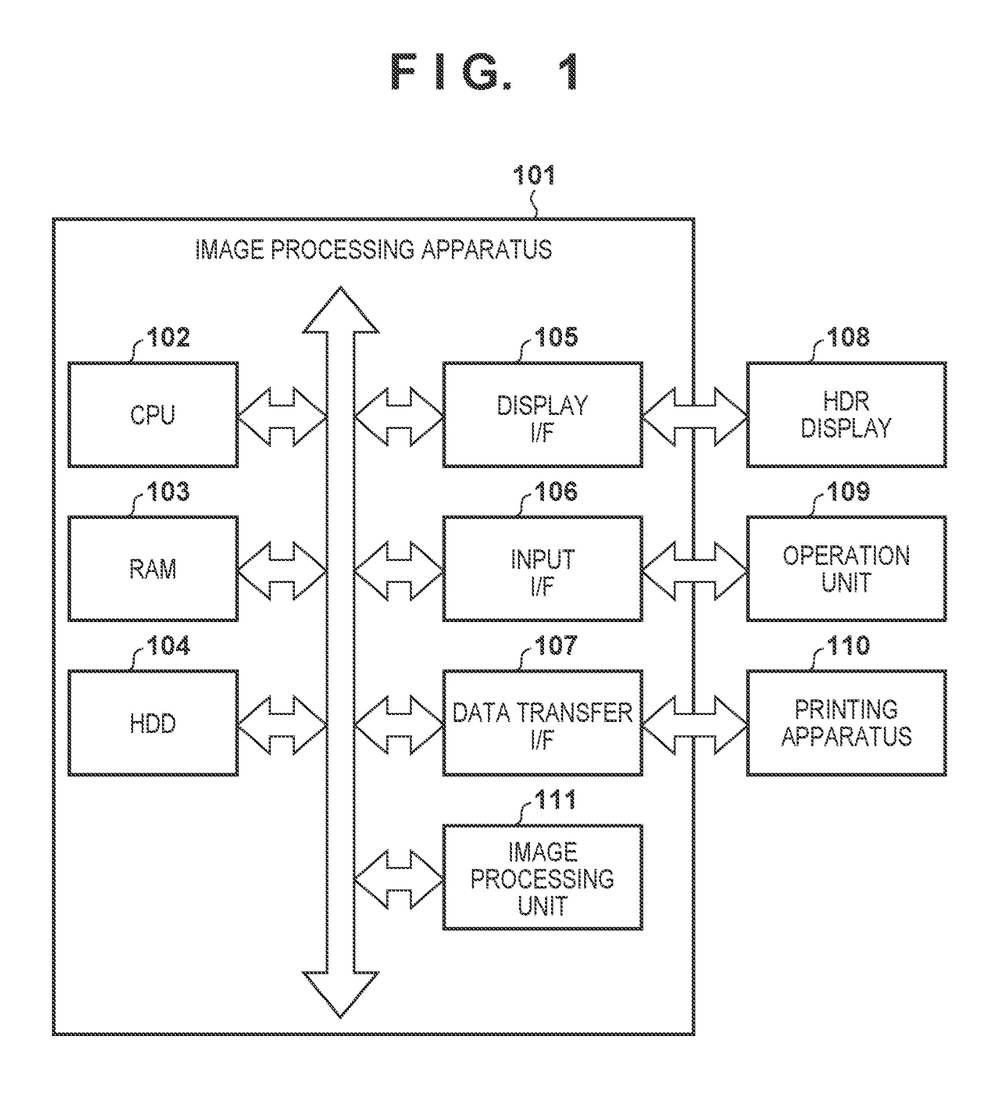
FIG. 1 is a diagram illustrating a configuration of a system.

FIG. 1 is a diagram illustrating an example of a configuration of a system in the present embodiment. The system is configured to include, for example, an image processing apparatus 101, an HDR display (display device) 108, and a printing apparatus 110. This configuration is an example, and may include devices other than those illustrated in FIG. 1. Further, a plurality of devices of FIG. 1 may be integrated into one device, such as the image processing apparatus 101 being integrated into the printing apparatus 110, for example. Additional blocks may also be included in the blocks that each device in FIG. 1 has. Each block that each device has may be divided into a plurality of blocks, or one block including a plurality of blocks may be used.

A host PC, or the like serving as an information processing apparatus, for example, is used as the image processing apparatus 101. The image processing apparatus 101 is configured to include a CPU 102, a RAM 103, an HDD 104, a display interface (I/F) 105, an input I/F 106, a data transfer I/F 107, and an image processing unit 111. Each unit is connected to each other via an internal bus so as be capable of communication.

The CPU 102 executes each processing, such as various kinds of processing related to the operation of the present embodiment, using the RAM 103 as a work area in accordance with a program held in the HDD 104. The CPU 102 is one example of a processor and other types of processors may be used. For example, other types of processors such as a GPU (Graphics Processing Unit) and a DSP (Digital Signal Processor) may be additionally or alternatively used. Some or all of the processing performed by the CPU 102 may be performed by hardware capable of performing that processing, such as an ASIC (Application Specific Integrated Circuit) or an FPGA (Field-Programmable Gate Array). The RAM 103 is a volatile storage area and is used, for example, as a work memory. The HDD 104 is a non-volatile storage area, and stores programs and data according to the present embodiment, an OS (Operating System), and the like.

The display I/F 105 is an interface for transmitting and receiving data to and from the HDR display 108. For example, HDMI® (High-Definition Multimedia Interface), DisplayPort, and the like, are used as methods of connection for the display I/F 105.

The HDR display 108 is capable of displaying high dynamic range image data (HDR image data) and is capable of simultaneously displaying a wide range from a highlight side to a shadow side of an image at a high image quality.

For example, Recommendation BT.2100 by ITU-R (International Telecommunication Union Wireless Radio communication Sector) specifies two transfer functions as video transfer functions for HDR image data. The two transfer functions are Hybrid Log Gamma (HLG) and Perceptual Quantization (PQ). Regarding the transfer functions, the transfer functions and the number of bits are defined so that the discontinuity of tone is not visually detected in the transmission of an image. A video method is specified by three transfer functions. One is an opto-electronic transfer function (OETF), which is a transfer function on an image capturing side. Another is an electro-optical transfer function (EOTF), which is a transfer function on a display side. Yet another is an opto-optical transfer function (OOTF), which represents an overall characteristic of display light from scene light. OOTF is a transfer function that corrects the difference in appearance due to the difference between an image capturing environment and a display environment. The HLG method is a method that treats what is between black and white as relative tones and specifies the above image-capturing-side OETF. The display-side EOTF is configured by an inverse function of the OETF and the OOTF, which represents the overall characteristic of display light from scene light. In the HLG method, system gamma, which determines the characteristic of the OOTF, is applied only to a luminance component. The system gamma is determined in accordance with the luminance of a display taking into account the difference in appearance on a display, in which the maximum luminance value that can be displayed, is different. The PQ method is a method in which the luminance on the display side is expressed by absolute values of up to ten thousand $cd/m^2$ (hereafter referred to as nits) and defines the above display-side EOTF. The image-capturing-side OETF is configured by the OOTF and an inverse function of the EOTF.

Figure 10:
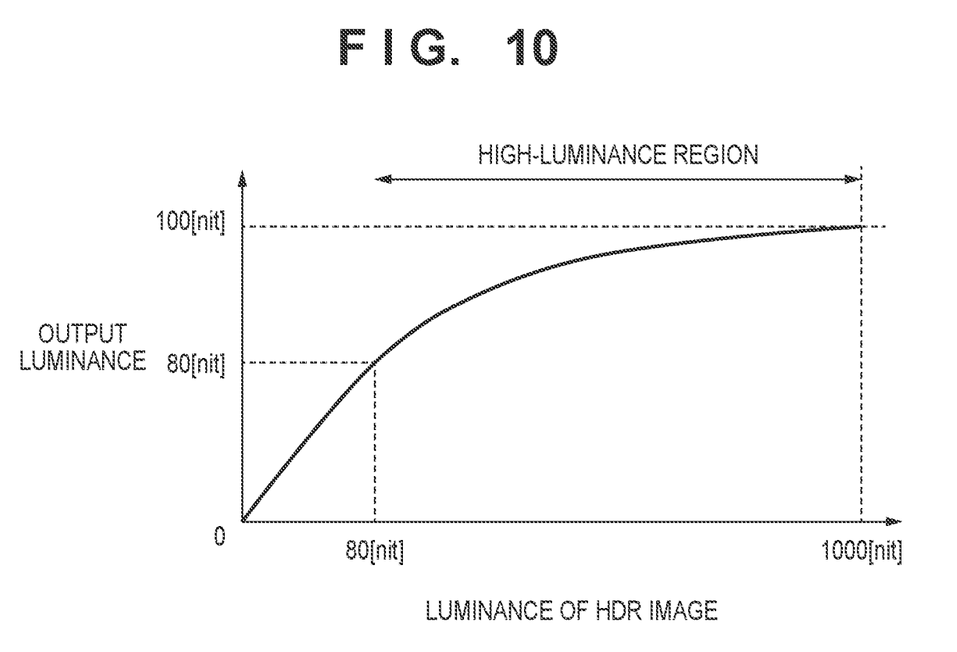
FIG. 10 is a diagram illustrating conversion of a dynamic range of luminance.

When displaying HDR image data on an SDR display or printing with a printing apparatus, it is necessary to perform dynamic range conversion using a tone curve, or the like, to a dynamic range of luminance that can be reproduced by that device. For example, dynamic range conversion is performed using a tone curve that reduces the contrast in a region where the luminance is high, as illustrated in FIG. 10.

The input I/F 106 is an interface for inputting information from a device that accepts a user operation, such as a keyboard, a pointing device, or a touch panel (not illustrated). The above-described device may be external to or included in the image processing apparatus 101. The data transfer I/F 107 is an interface for transmitting and receiving data to and from the printing apparatus 110. For example, a USB (Universal Serial Bus), IEEE 1394, and the like, are used as methods of connection for the data transfer I/F 107. For example, the CPU 102 generates printing data that can be processed by the printing apparatus 110 from image data and transfers the printing data to the printing apparatus 110 in accordance with an instruction (such as a command) by a user using the operation unit 109 or a program held in the HDD 104. For example, an inkjet printing method, or the like, is used as the printing method of the printing apparatus 110. In the present embodiment, the printing method is not limited to this, and a printing apparatus of an electrophotographic method may be used, for example. The medium of each interface in FIG. 1 may be either wired or wireless.

Figure 2:
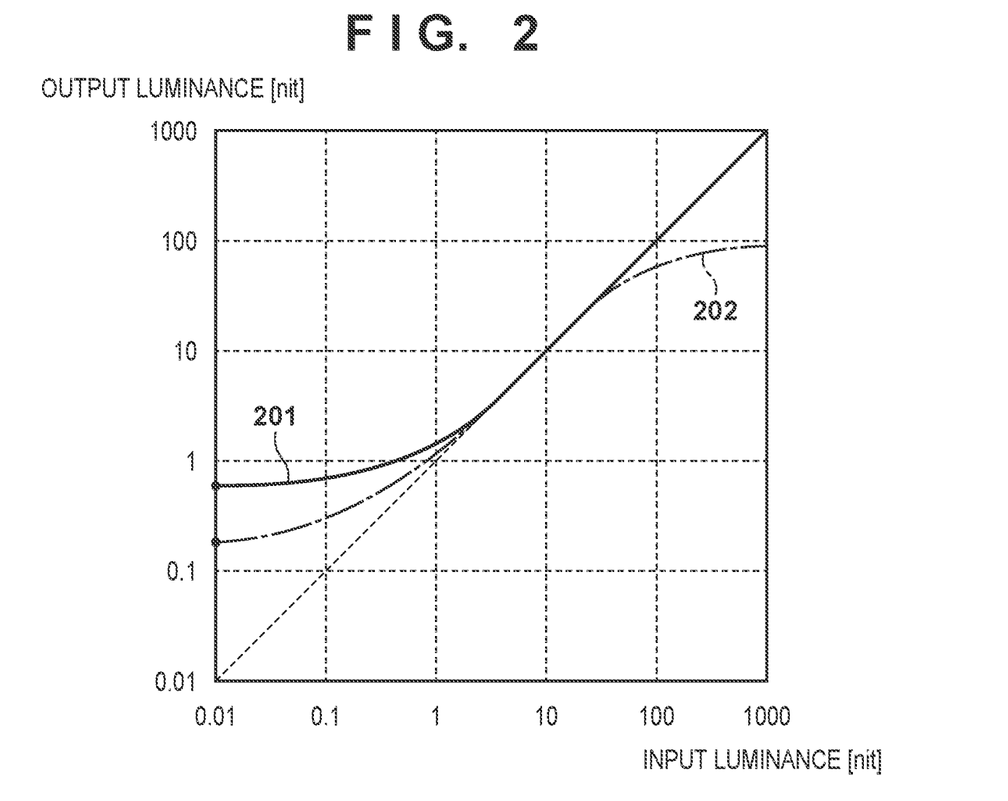
FIG. 2 is a diagram illustrating a display luminance characteristic of a display.

FIG. 2 is a diagram illustrating a display luminance characteristic of a display. Hereafter, a liquid crystal display having a contrast ratio of 1300:1 will be described as an example. In FIG. 2, a luminance characteristic 201 indicates a display luminance characteristic of a display. A luminance characteristic 202 indicates a reproduced luminance characteristic of printed matter. The horizontal axis indicates the luminance value of image data to be inputted, and the vertical axis indicates the luminance value to be outputted.

When displaying the maximum luminance value to be displayed by the display at a luminance of one thousand nits, since the contrast ratio is 1300:1, the minimum luminance value becomes 0.77 nit. Meanwhile, when printing is executed on glossy paper by an inkjet printer used for photography printing, there is a combination of a printer and paper by which the density of black becomes 2.6. When the density 2.6 is converted to reflectance, it is 0.25%. When one hundred nits of light, which is a typical luminance for observing printed matter, is applied on this black, it becomes 0.25 nit. In such an environment, the black displayed on the display is brighter than the black on the printed material, so, for the user, the contrast for the dark region appears to be lower on the display. That is, the image displayed on the display and the printed matter appear to be different to the user.

In the present embodiment, when output image data is generated from input image data displayed on a display by converting the luminance range and printed matter is outputted based on that output image data, the minimum luminance value of the output image data is set based on the minimum luminance value of the input image data. Such a configuration can suppress a difference in appearance to the user between an image being displayed on a display and printed matter.

Figure 3:
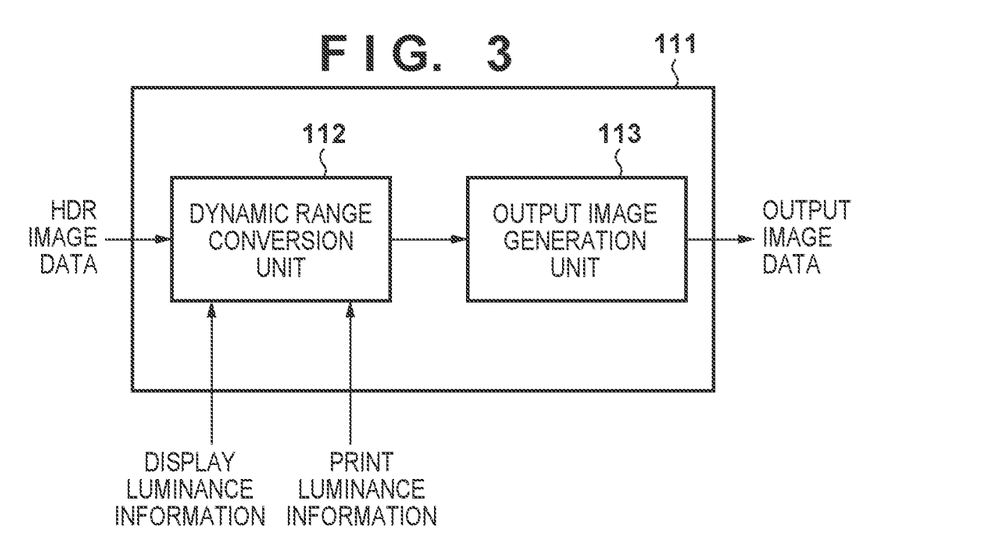
FIG. 3 is a diagram illustrating a configuration of an image processing unit.

FIG. 3 is a diagram illustrating a configuration of the image processing unit 111. In the image processing unit 111, HDR image data, display luminance information of a display that performs display based on the HDR image data, and print luminance information are inputted to the dynamic range conversion unit 112. The display luminance information and print luminance information will be described later. In the dynamic range conversion unit 112, conversion to image data of a luminance dynamic range (hereafter, simply referred to as a dynamic range) that can be inputted to an output image generation unit 113 is performed using each inputted information. The dynamic range of image data to be inputted to the output image generation unit 113 becomes narrower than the dynamic range of HDR image data to be inputted. A dynamic range that can be inputted to the output image generation unit 113 is, for example, a dynamic range of the maximum luminance value one hundred $cd/m^2$ in SDR data to be inputted on a typical printer. It may also be a dynamic range of when printed matter is exposed to illumination. In the present embodiment, the dynamic range conversion unit 112 generates image data converted from a dynamic range of one thousand nits to a dynamic range of one hundred nits. The output image generation unit 113 generates data that can be printed by a printhead of an inkjet printer with respect to the image data outputted from the dynamic range conversion unit 112. Image data outputted from the dynamic range conversion unit 112 is, for example, RGB image data represented by a Red, Green, and Blue color space.

Figure 4:
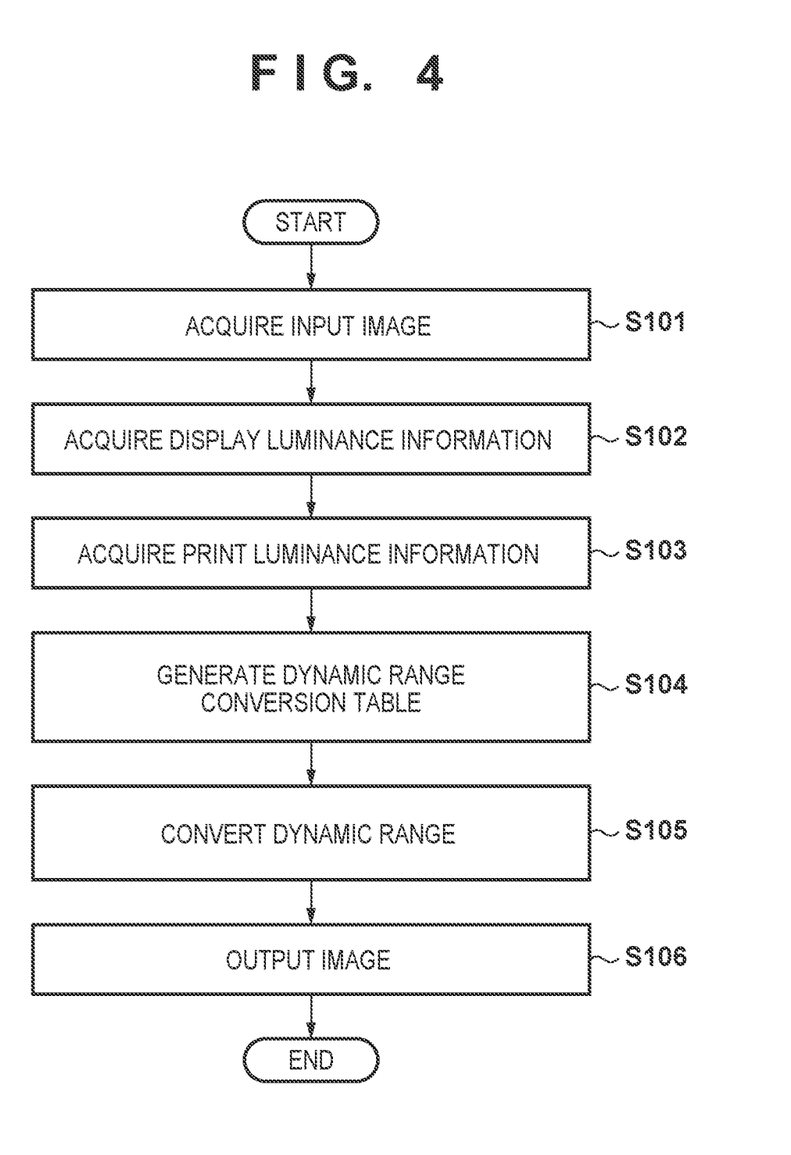
FIG. 4 is a flowchart for explaining processing until printing is performed by a printing apparatus.

FIG. 4 is a flowchart for explaining the processing for conversion of a dynamic range for printing HDR image data to be displayed on a display by the printing apparatus 110. The processing of FIG. 4 is realized, for example, by the CPU 102 reading and executing a program stored in the HDD 104.

In step S101, the image processing unit 111 acquires HDR image data to be displayed on the HDR display 108 as input image data. In step S101, a configuration may be taken so as to acquire HDR image data held in the HDD 104 or to acquire HDR image data from an external device via the data transfer I/F 107. In the present embodiment, RGB image data, whose maximum luminance value of the dynamic range is one thousand nits, will be described as an example of HDR image data.

In step S102, the image processing unit 111 acquires the display luminance information of the HDR display 108 currently displaying the image. The display luminance information includes, for example, the maximum luminance value, the minimum luminance value, and the contrast ratio of the HDR display 108. These pieces of display luminance information are acquired from the HDR display 108 via the display I/F 105. Alternatively, the display luminance information may be stored in advance in the HDD 104 and acquired from the HDD 104. In the present embodiment, the display luminance information is acquired from the HDR display 108, and, for example, it is assumed that the maximum luminance value is one thousand nits and the minimum luminance value is 0.77 nit as the display luminance information. The minimum luminance value may be calculated from the maximum luminance value and the contrast ratio. For example, if the contrast ratio is 1300:1, the minimum luminance can be calculated by Equation (1).

$$\text{minimum luminance value} = \text{maximum luminance value} \times (1/1300) \tag{1}$$

In step S103, the image processing unit 111 acquires the maximum luminance value and the minimum luminance value that can be reproduced by the printing apparatus 110 as the print luminance information on printing by the printing apparatus 110. The print luminance information is acquired from the printing apparatus 110 via the data transfer I/F 107. Alternatively, the print luminance information may be stored in advance in the HDD 104 and acquired from the HDD 104. The print luminance information may be, aside from luminance, L* which represents brightness or may be stored as an International Color Consortium (ICC) profile. In other words, it may be in any form that can be converted into luminance information. In the present embodiment, the maximum luminance value is set to one hundred nits and the minimum luminance value is set to 0.25 nit as the print luminance information, for example.

In step S104, the image processing unit 111 generates a luminance dynamic range conversion table. The dynamic range conversion table is a table in a lookup table (LUT) format used for when performing dynamic range conversion on luminance components in step S105.

Figure 5:
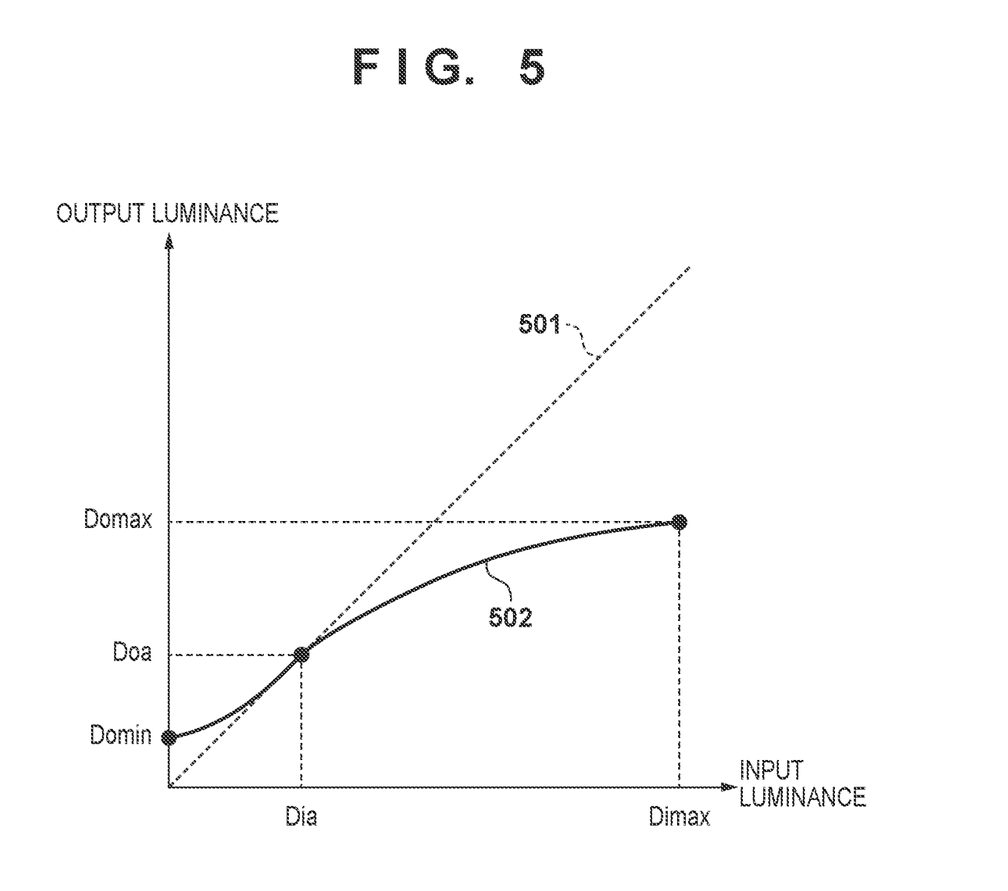
FIG. 5 is a diagram for explaining creation of a dynamic range conversion table.

A description will be given on a method for creating a dynamic range conversion table in step S104 with reference to FIG. 5. In FIG. 5, the horizontal axis represents the luminance of an input image, and the vertical axis represents the luminance of an output image. A dotted line 501 represents a line where the input luminance and the output luminance coincide. A solid line 502 represents the correspondence between the input luminance and the output luminance for when performing dynamic range conversion.

Dimax is the maximum luminance value of the input image, and one thousand nits is set, for example. Domax is the maximum luminance value of the output image, and one hundred nits, which is the maximum luminance value of the print luminance information acquired in step S103, is set, for example. For example, eighteen nits is set as a reference point Dia and Dio where the input luminance and the output luminance coincide. Dia and Dio are set based on a predetermined reflectance as a reference. Since exposure is adjusted to a grey with an 18% reflectance at the time of image capturing, luminance is based on an 18% reflectance. If the luminance corresponding to 100% reflectance is one hundred nits, 18% reflectance becomes eighteen nits.

Domin is the minimum luminance value of the output image. In the present embodiment, the minimum luminance value of the display luminance information acquired in step S102 is 0.77 nit, and the minimum luminance value of the print luminance information of the printing apparatus 110 acquired in step S103 is 0.25 nit, for example. Since the black displayed on the HDR display 108 is brighter than the black reproduced on the printing apparatus 110, 0.77 nit is set as Domin so that the black on the printed matter matches that of the display on the display. Here, when the minimum luminance value of the display luminance information is less than the minimum luminance value of the print luminance information of the printing apparatus 110, zero nit is set as Domin.

The image processing unit 111 generates a dynamic range conversion curve by connecting Domin, the point of intersection of Dia and Doa, and the point of intersection of Dimax and Domax so as to be a smooth curve by performing spline interpolation. The curve generated by spline interpolation is converted into a one-dimensional LUT format. Although spline interpolation is used in the present embodiment, another configuration, such as histogram smoothing processing for smoothing a histogram of an image, may be used.

In step S105, the image processing unit 111 converts the dynamic range of luminance for generating output image data for printing by the printing apparatus 110 from the input image data acquired in step S101 using the dynamic range conversion table generated in step S104. The dynamic range conversion in step S105 will be described with reference to the flowchart of FIG. 6.

Figure 6:
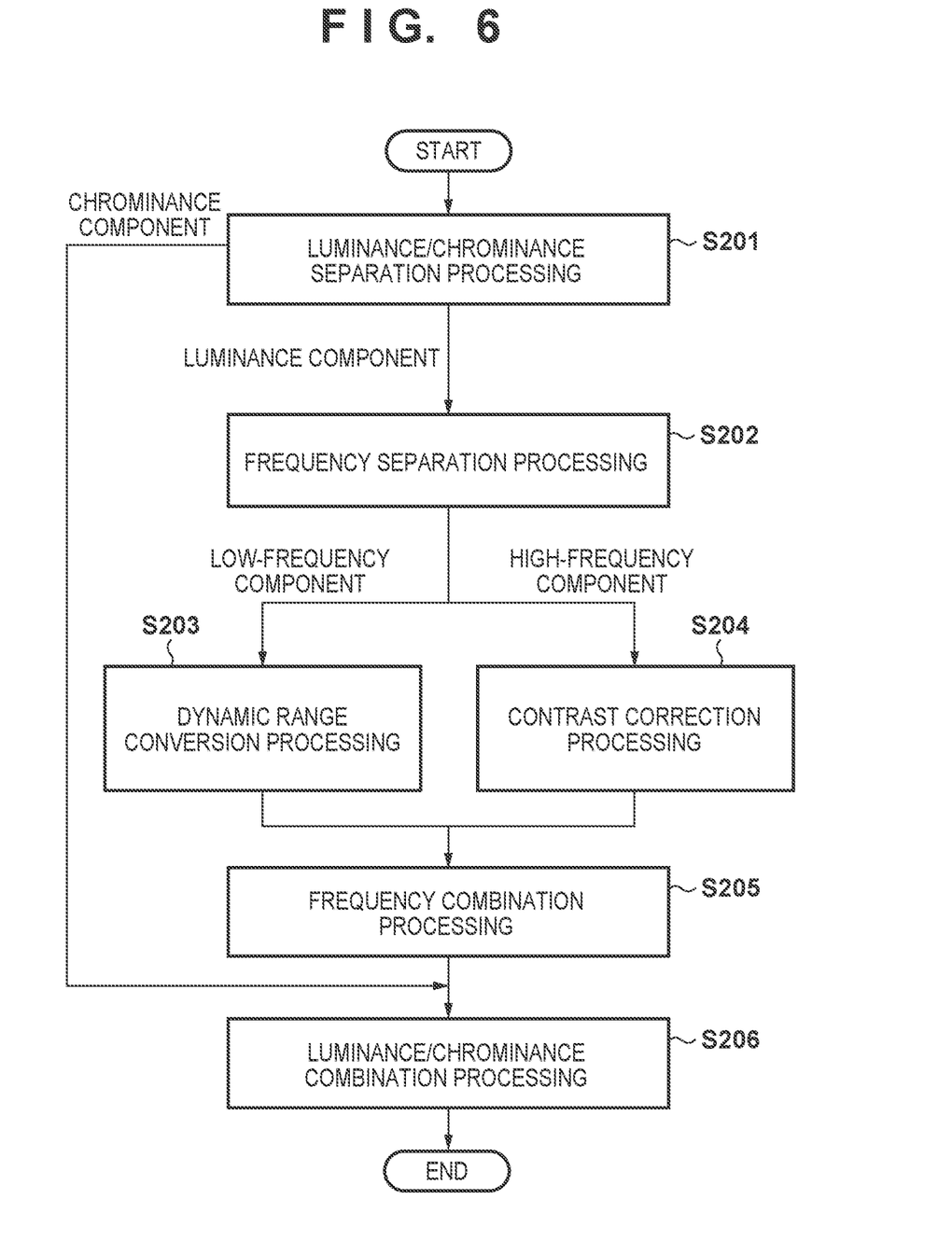
FIG. 6 is a flowchart for explaining processing for dynamic range conversion.

In step S201 of FIG. 6, the image processing unit 111 separates input image data into a luminance component and a chrominance component. For example, when input image data is an RGB color space, the image processing unit 111 converts the input image data into a YCbCr color space using Equations (2) to (4). Here, Y is the luminance component and CbCr is the chrominance component. Further, a color space, into which conversion is performed is not limited to the YCbCr color space and conversion into an ICtCp color space may be performed, for example.

$$Y=0.299 \times R+0.587 \times G+0.114 \times B \quad (2)$$

$$Cb=-0.169 \times R-0.331 \times G+0.5 \times B \quad (3)$$

$$Cr=0.5 \times R-0.419 \times G-0.081 \times B \quad (4)$$

In step S202, the image processing unit 111 performs frequency separation processing so as to separate the luminance component generated in step S201 into a low-frequency component and a high-frequency component. This is because the processing is switched between low and high frequency components based on the Retinex theory. The Retinex theory is a model of how the human brain captures colors and light. In this theory, the intensity of light entering the eyes is expressed by the product of reflectance of an object and light illuminating that object, and it is assumed that luminance and color perceived by a person are largely dependent on the amount of relative change from the surroundings rather than the absolute optical amounts. The absolute optical amount means the light illuminating an object, and the amount of relative change is the reflectance of an object.

In step S202, the low frequency component of an image is separated and extracted as an illumination light component illuminating an object. A low-pass filter is applied to separate the low-frequency component. The method for processing may be applying a spatial filter or first converting into a spatial frequency by FFT (Fast Fourier Transform) and then reversing by IFFT (Inverse Fast Fourier Transform) after filtering. The target frequency may be determined from the paper size and viewing distance for when viewing printed matter by taking into account human visual characteristics. For extraction of the high-frequency component, a high-pass filter may be applied, or an original image may be divided by the acquired low-frequency component.

In step S203, the image processing unit 111 performs dynamic range conversion processing on the low-frequency component separated in step S202. The image processing unit 111 converts the luminance component using the dynamic range conversion table generated in step S104.

In step S204, the image processing unit 111 executes contrast correction processing on the high-frequency component. The contrast correction processing is processing of multiplying the value of the high-frequency component by a coefficient k. When faithfully approximating to the input data, k=approximately one, and, when deterioration, such as ink bleeding on printed matter is further taken into account, k is set to a value greater than or equal to one.

In step S205, the image processing unit 111 recombines the data on which the dynamic range conversion has been executed in step S203 and the data on which the contrast correction processing has been executed in step S204. In step S206, the image processing unit 111 combines the luminance component and the chrominance component, and converts the combined luminance component and chrominance component into an RGB color space using Equations (5) to (7).

$$R=Y+1.402 \times Cr \quad (5)$$

$$G=Y-0.344 \times Cb-0.714 \times Cr \quad (6)$$

$$B=Y+1.772 \times Cb \quad (7)$$

After step S206, the processing of FIG. 6 ends, and the processing proceeds to step S106 of FIG. 4. In step S106, the output image generation unit 113 converts the image data that has been subjected to dynamic range conversion in step S105 into data that can be processed by the printing apparatus 110, such as print data corresponding to the ejection of ink from a printhead, and then outputs the data.

As described above, in the present embodiment, as illustrated in FIG. 5, the minimum luminance value of display luminance information is set as the minimum luminance value of output image. With such a configuration, dynamic range conversion is performed so as to bring the contrast of a dark region of printed matter closer to the contrast of a dark region of a display. As a result, it is possible to perform control so as to suppress the difference in the appearance of an image displayed on the display and the appearance of an image on the printed matter printed by the printing apparatus.

Second Embodiment

Figure 7:
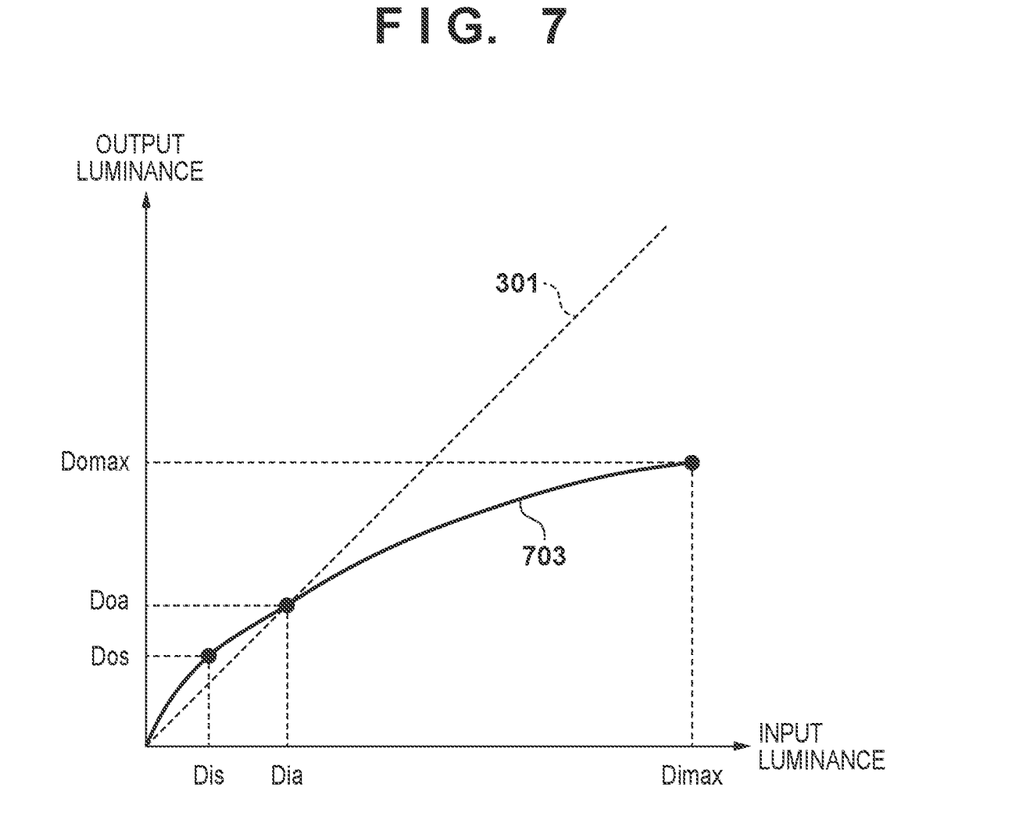
FIG. 7 is a diagram for explaining creation of the dynamic range conversion table.

Hereafter, a second embodiment will be described regarding the points that are different from the first embodiment. A description will be given on a method for generating a dynamic range conversion table in step S104 of FIG. 4, in the present embodiment, with reference to FIG. 7. A solid line 703 in FIG. 7 represents the correspondence between the input luminance and the output luminance when performing dynamic range conversion. Dis is a point in a shadow portion of input luminance, and Dos is the output luminance corresponding thereto. In the first embodiment, the minimum luminance value of an output image is set based on the display luminance information and the print luminance information. In the present embodiment, a luminance conversion line for the shadow portion is set based on the display luminance information and the print luminance information.

A luminance that is less than Dia and brighter than the minimum luminance value is set as Dis in FIG. 7. In present embodiment, Dis=9 which is a half value of Dia=18 is set, for example. Then, Dos corresponding to Dis is set using Equation (8). In Equation (8), m is a coefficient.

$$Dos=Dis+m\times(\text{minimum luminance value of the display luminance}-\text{minimum luminance value of the printing apparatus}) \quad (8)$$

The minimum luminance value of the display luminance information acquired in step S102 is 0.77 nit, and the minimum luminance value of the print luminance information of the printing apparatus 110 acquired in step S103 is 0.25 nit, for example. In that case, when m=4, Dos=9+4×(0.77−0.25)=11.08 is calculated from Equation (8). Here, when the minimum luminance value of the display luminance information is less than the minimum luminance value of the print luminance information of the printing apparatus 110, Dos takes on a negative value. In that case, however, Dos=Dis. Dimax, Domax, Dia, and Doa are the same as in the description in the first embodiment.

The image processing unit 111 performs spline interpolation so that a smooth curve is generated through each control point and an origin determined as described above. The curve generated by spline interpolation is such that Dos becomes an inflection point, as illustrated in FIG. 7, and is converted into a one-dimensional LUT format. Although spline interpolation is used in the present embodiment, another configuration, such as histogram smoothing processing for smoothing a histogram of an image, may be used.

As described above, according to the present embodiment, a shadow portion of a dynamic range conversion table is controlled to be brighter, as the minimum luminance value of the display luminance information becomes brighter than the minimum luminance value of the print luminance information of a printing apparatus. By controlling the shadow portion to be brighter by dynamic range conversion processing, a difference in contrast, between a dark region displayed on a display and on printed matter, is suppressed. As a result, it is possible to perform control so as to suppress the difference in the appearance of an image displayed on the display and the appearance of an image on the printed matter printed by the printing apparatus.

Figure 8:
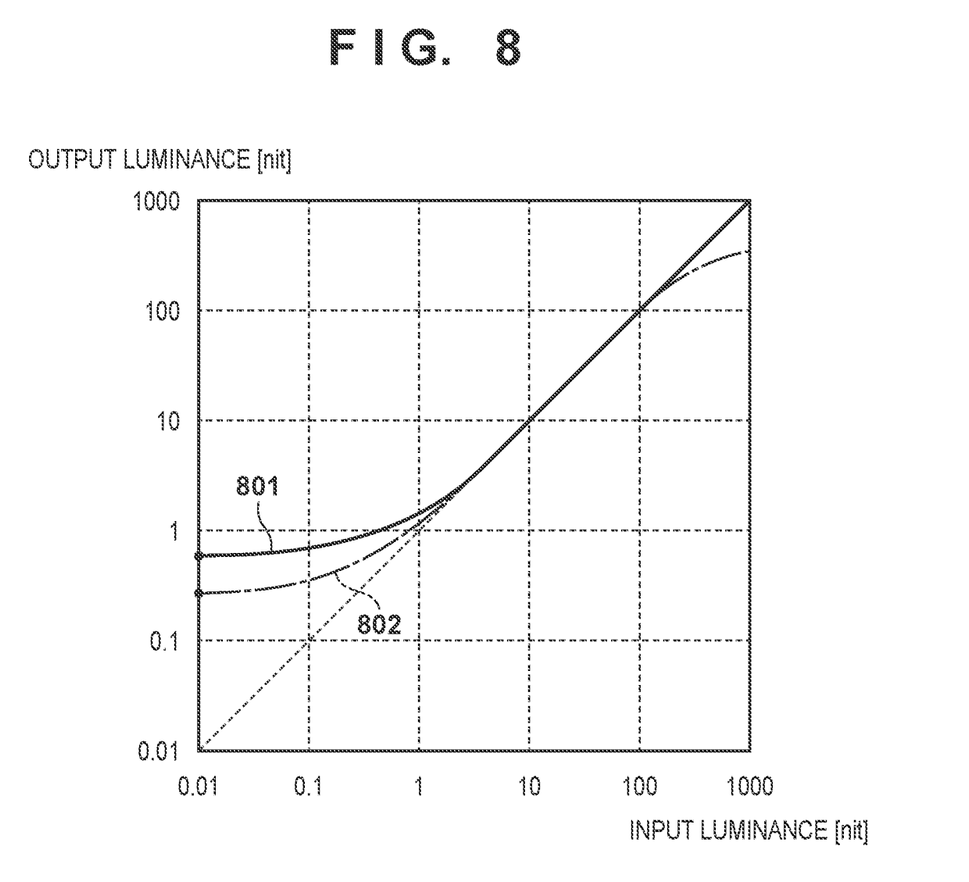
FIG. 8 is a diagram illustrating a display luminance characteristic of a display when exposed to bright illumination.

Hereafter, a case, in which printed matter outputted from the printing apparatus 110 is observed under brighter illumination than in the case of the reproduced luminance characteristic of printed matter illustrated in FIG. 2, will be described. FIG. 8 represents the display luminance characteristic of a display and the reproduced luminance characteristic of printed matter. A display luminance characteristic 801 of the display is the same as the display luminance characteristic 201 of the display of FIG. 2. A luminance characteristic 802 is a reproduced luminance characteristic for when printed matter is illuminated. However, a case when brighter illumination than in FIG. 2 is applied on the printed matter is envisioned. A black on printed matter that is 0.25 nit when exposed to light of one hundred nits becomes 0.5 nit when exposed to light of two hundred nits, proportionally. That is, the luminance characteristic 802 indicates the luminance characteristic for when exposed to light of two hundred nits.

In this case, the dynamic range conversion table of luminance is also created as in the first embodiment and the second embodiment. Hereafter, the processing in step S103 of FIG. 4 in the present case will be described. Steps S101 and S102 are the same as those in the description of the first embodiment and the second embodiment, so their description will be omitted.

In step S103, the image processing unit 111 acquires, as the print luminance information, the maximum luminance value and the minimum luminance value reproduced by the printing apparatus 110, for when illumination such as light of two hundred nits that is brighter than a reference, is applied. The maximum luminance value, and the minimum luminance value for when illumination that is brighter than the reference is applied, can be calculated from the luminance value and the illumination condition for when the illumination of reference luminance is applied. That is, since a luminance value is proportional to luminance of illumination, the maximum luminance value and the minimum luminance value, for when illumination that is brighter than the reference is applied, are calculated by multiplying the ratio of illumination conditions with the maximum luminance value and the minimum luminance value for when reference illumination is applied. Steps S104 to S106, subsequent to step S103, are processed as in the description of the first embodiment and the second embodiment.

In this way, it is possible to create a luminance dynamic range conversion table by calculating the print luminance information corresponding to any illumination condition based on the print luminance information corresponding to an illumination condition serving as a reference.

Figure 9:
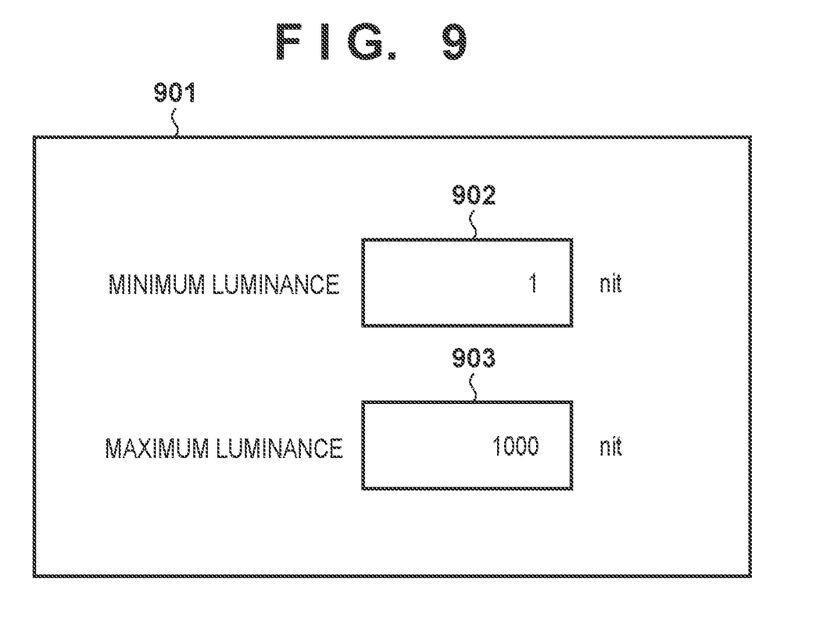
FIG. 9 is a diagram illustrating a user interface screen for acquiring display luminance information.

In the above-described embodiments, in step S102, the image processing unit 111 may acquire the display luminance information of the HDR display 108 via a user interface screen. FIG. 9 illustrates a screen 901 for acquiring the display luminance information. A text box 902 is an input region for inputting the minimum luminance value of the HDR display 108, and a text box 903 is an input region for inputting the maximum luminance value of the HDR display 108. The user operates the operation unit 109 to input luminance values to the text boxes 902 and 903. The image processing unit 111 acquires the values inputted to the text boxes 902 and 903, and sets them as the minimum luminance value and the maximum luminance value of the display luminance information.

By allowing the user to input the luminance values as in FIG. 9, it becomes possible for the user to manipulate the contrast of a dark region of printed matter outputted from the printing apparatus 110. That is, even when there are individual differences in a difference between the appearance of an image displayed on a desired display and the appearance on printed matter outputted by the printing apparatus 110, it is possible to appropriately perform control so as to suppress the difference in appearance.

Other Embodiments

Embodiment(s) of the present invention can also be realized by a computer of a system or an apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications, and equivalent structures and functions.

What is claimed is:

1. An information processing apparatus comprising:
   a first acquisition unit configured to acquire input image data;
   a second acquisition unit configured to acquire display luminance information that includes a maximum luminance value and a minimum luminance value in displaying on a display device and print luminance information that includes a maximum luminance value and a minimum luminance value to be reproduced on printed matter to be outputted by a printing apparatus; and
   a conversion unit configured, in order to cause the printing apparatus to perform output based on the input image data for which display is performed on the display device, to convert a first luminance range of the input image data to a second luminance range that is less than the first luminance range and, then, to generate output image data having the second luminance range,
   wherein the minimum luminance value of the display luminance information is greater than the minimum luminance value of the print luminance information, and
   the conversion unit converts a luminance value of a dark region of the input image data to a luminance value of a dark region of the output image data such that a contrast of a dark region that includes the minimum luminance value of the print luminance information becomes closer to a contrast of a dark region that includes the minimum luminance value of the display luminance information.

2. The information processing apparatus according to claim 1, wherein the conversion unit converts the luminance value of the input image data to the luminance value of the output image data using a conversion curve in which the luminance value of the input image data and the luminance value of the output image data are associated.

3. The information processing apparatus according to claim 2, wherein,
   in the conversion curve, the minimum luminance value of the display luminance information is set as a minimum luminance value of the second luminance range.

4. The information processing apparatus according to claim 2, wherein, in the conversion curve, a correspondence relationship of luminance values between a dark region of the first luminance range and a dark region of the second luminance range is convex on a side of the second luminance range.

5. The information processing apparatus according to claim 4, wherein the conversion curve is set based on a predetermined luminance value of the dark region of the first luminance range.

6. The information processing apparatus according to claim 5, wherein the conversion curve is set such that a point of intersection of the predetermined luminance value and a luminance value, in which a difference between the minimum luminance value of the display luminance information and the minimum luminance value of the print luminance information has been added to the predetermined luminance value, is an inflection point.

7. The information processing apparatus according to claim 1, wherein a dark region of the first luminance range and a dark region of the second luminance range are set based on a predetermined reflectance.

8. The information processing apparatus according to claim 1, wherein the conversion unit is stored in the information processing apparatus as a lookup table.

9. The information processing apparatus according to claim 1, wherein the second acquisition unit acquires the display luminance information via a user interface screen.

10. The information processing apparatus according to claim 1, wherein the second acquisition unit acquires the print luminance information based on an illumination condition that is a reference.

11. The information processing apparatus according to claim 1, further comprising a control unit configured to cause the printing apparatus to perform an output based on the output image data generated by the conversion unit.

12. The information processing apparatus according to claim 1, wherein the input image data is High Dynamic Range (HDR) image data.

13. An information processing method comprising:
   acquiring input image data;
   acquiring display luminance information that includes a maximum luminance value and a minimum luminance value in display on a display device and print luminance information that includes a maximum luminance value and a minimum luminance value to be reproduced on printed matter to be outputted by a printing apparatus; and
   in order to cause the printing apparatus to perform an output based on the input image data for which display is performed on the display device, converting a first luminance range of the input image data to a second luminance range that is less than the first luminance range and then generating output image data having the second luminance range,
   wherein the minimum luminance value of the display luminance information is greater than the minimum luminance value of the print luminance information, and
   a luminance value of a dark region of the input image data is converted to a luminance value of a dark region of the output image data such that a contrast of a dark region that includes the minimum luminance value of the print luminance information becomes closer to a contrast of a dark region that includes the minimum luminance value of the display luminance information.

14. The information processing method according to claim 13, wherein the luminance value of the input image data is converted to the luminance value of the output image data using a conversion curve, in which the luminance value of the input image data and the luminance value of the output image data are associated.

15. The information processing method according to claim 14, wherein,
in the conversion curve, the minimum luminance value of the display luminance information is set as a minimum luminance value of the second luminance range.

16. The information processing method according to claim 14, wherein, in the conversion curve, a correspondence relationship of luminance values between a dark region of the first luminance range and a dark region of the second luminance range is convex on a side of the second luminance range.

17. The information processing method according to claim 16, wherein the conversion curve is set based on a predetermined luminance value of the dark region of the first luminance range.

18. The information processing method according to claim 13, wherein the input image data is High Dynamic Range (HDR) image data.

19. A non-transitory computer-readable storage medium storing a program configured to cause a computer to function:
acquire input image data;
acquire display luminance information that includes a maximum luminance value and a minimum luminance value in a display on a display device, and print luminance information that includes a maximum luminance value and a minimum luminance value to be reproduced on printed matter to be outputted by a printing apparatus; and
in order to cause the printing apparatus to perform an output based on the input image data for which display is performed on the display device, converting a first luminance range of the input image data to a second luminance range that is less than the first luminance range and then generating output image data having the second luminance range,
wherein
the minimum luminance value of the display luminance information is greater than the minimum luminance value of the print luminance information, and
a luminance value of a dark region of the input image data is converted to a luminance value of a dark region of the output image data, such that a contrast of a dark region that includes the minimum luminance value of the print luminance information becomes closer to a contrast of a dark region that includes the minimum luminance value of the display luminance information.

* * * * *